United States Patent [19]

Heideman et al.

[11] Patent Number: 5,407,052
[45] Date of Patent: Apr. 18, 1995

[54] SNUBBER ASSEMBLY

[75] Inventors: Robert J. Heideman, Westland; Richard T. Mitera, Canton, both of Mich.

[73] Assignee: Enertrols, Inc., Westland, Mich.

[21] Appl. No.: 2,813

[22] Filed: Jan. 11, 1993

[51] Int. Cl.⁶ .......................................... B65G 15/00
[52] U.S. Cl. ................................ 198/343.2; 198/802; 188/322.12; 104/172.3
[58] Field of Search ................ 198/802, 343.2, 474.1; 188/322.19, 322.12, 283, 266, 282; 267/64.26; 104/172.3

[56] References Cited

U.S. PATENT DOCUMENTS

| Re. 33,798 | 1/1992 | Waltonen | 83/529 |
|---|---|---|---|
| 2,634,851 | 4/1953 | Steinhoff | 198/343.2 X |
| 3,371,751 | 3/1968 | Dickinson | 188/88 |
| 3,720,172 | 3/1973 | Dehne | 104/172 S |
| 3,794,309 | 2/1974 | Chrokey et al. | 267/34 |
| 3,827,539 | 8/1974 | Fader et al. | 188/322.12 X |
| 3,948,359 | 4/1976 | Rogers | 188/1 A |
| 4,141,572 | 2/1979 | Sorensen | 280/707 |

FOREIGN PATENT DOCUMENTS 0021367  2/1980  Japan ..................................... 198/802

Primary Examiner—Cheryl L. Gastineau
Attorney, Agent, or Firm—Krass & Young

[57] ABSTRACT

An improved snubber assembly for interconnecting a driving conveyor assembly to a driven conveyor assembly. The snubber assembly includes a shield tube adapted to be attached to the driven conveyor assembly, a cylinder structure, a piston, and a piston rod. The cylinder structure includes a hollow inboard end portion defining a cylinder bore and slidably received in the bore of the shield tube and a solid outboard end portion closing the outboard end of the cylinder bore and positioned outside of the tube bore for attachment to the driving conveyor assembly. The piston is slidably mounted in the cylinder bore and a clevis is secured to the outboard end of the piston rod and fixedly mounted within the bore of the shield tube by a pin passing through the walls of the tube and through the clevis.

7 Claims, 3 Drawing Sheets

SNUBBER ASSEMBLY

BACKGROUND OF THE INVENTION

This invention relates generally to improvements in conveyor assemblies and more particularly to an improved snubber assembly or tow bar for interposition between a driving conveyor assembly and a driven conveyor assembly.

Conveyor assembly systems of this type are in common usage in transporting loads, such for example as automobile bodies, over large areas of a factory floor to facilitate sequential operations on the load at sequential load stations. Systems of this type commonly undergo frequent stop and start operations and the stop and start operations result in heavy shock loading on the driving conveyor assembly as well as on the driven conveyor assembly with the shock loading increasing in severity and destructiveness as the weight of the load and the speed of movement of the assembly increases. Whereas various shock absorbing devices have been proposed to reduce the shock loading as the conveyor assemblies are stopped and started, the prior art absorbing devices have been unsatisfactory in various respects. Specifically, the prior art absorbing devices have either consisted of devices that are independent of the snubber or tow bar assemblies interconnecting the driving and driven conveyor assemblies or devices that are incorporated as a part of the snubber assembly. The independent devices add considerably to the complexity and cost of the overall conveyor system and the incorporated devices have suffered from the disadvantage that the design of the snubber assembly has exposed critical elements of the snubber to damage from falling objects or careless operators and has allowed contaminants to enter into the critical sliding interfaces of the components of the snubber assembly, especially as the assemblies are moved through high contamination areas such as paint spray booths, with the result that frequent servicing of the snubber assemblies is required.

SUMMARY OF THE INVENTION

This invention is directed to the provision of an improved conveyor assembly.

More specifically, this invention is directed to the provision of an improved snubber assembly for interconnecting the driving and driven assemblies of a conveyor system.

Yet more specifically this invention is directed to the provision of an improved snubber assembly for interposition between driving and driven conveyor assemblies wherein the snubber assembly embodies a simple construction which operates to effectively dampen shock loading upon stopping and starting of the conveyor assembly and which further operates to minimize maintenance requirements with respect to the snubber assembly.

The invention snubber assembly is of the type adapted to be interposed between a driving member and a driven member and includes a cylinder structure defining a bore and adapted to be associated with one of the members; a piston mounted for reciprocal sliding movement in the cylinder bore; and a piston rod connected to the piston and adapted to be associated with the other member.

According to the invention, a shield bore is provided on the driven member, the cylinder structure includes a hollow inboard end portion defining the cylinder bore and a solid outboard end portion closing the outboard end of the cylinder bore, the hollow inboard end portion of the cylinder structure is slidably received in the shield bore, the solid outboard end portion of the cylinder is positioned outside of the shield bore for engagement by the driving member, and the piston rod is positioned rigidly in the shield bore and extends into the cylinder bore for connection at its inboard end to the piston. With this arrangement the snubber assembly acts to effectively absorb shock loading upon stopping and starting of the conveyor system including the driving and driven members and contaminants are effectively precluded from entering the interface between the piston rod and the associated bearing structure of the cylinder structure.

According to a further feature of the invention, the snubber assembly further includes a clevis fixedly positioned in the shield bore, and the outboard end of the piston rod is connected to the clevis. This arrangement provides a convenient means of fixedly positioning the piston rod within the shield bore.

According to a further feature of the invention, the shield bore is defined by a shield tube adapted to be attached to the driven member and the clevis is fixedly positioned in the shield tube bore by a pin passing through the tube walls and the clevis. This specific structure provides a compact overall package and provides a convenient means of fixedly positioning the piston rod within the bore of the shield tube.

According to a further aspect of the invention, the invention provides a conveyor assembly comprising a track; a carrier mounted for movement along the track and adapted to support a load to be transported along the track; a conveyor mechanism; a tube pivotally attached at its outboard end to the carrier and defining a tube bore opening at the inboard end of the tube; a cylinder structure including an outboard portion pivotally attached to the conveyor assembly and an inboard portion defining a cylinder bore and slidably received in the inboard end of the tube bore; a piston slidably mounted in the cylinder bore; and a piston rod fixedly positioned at its outboard end in the tube bore and extending into the cylinder bore for connection at its inboard end to the piston. This arrangement provides a conveyor assembly including a piston and cylinder type shock absorber interconnecting the driving and driven elements of the conveyor assembly and incorporating a structure that precludes the entry of contaminants into the critical sliding interfaces of the piston and cylinder structure.

DETAILED DESCRIPTION OF THE PREFERRED EMBODIMENT

Figure 1:
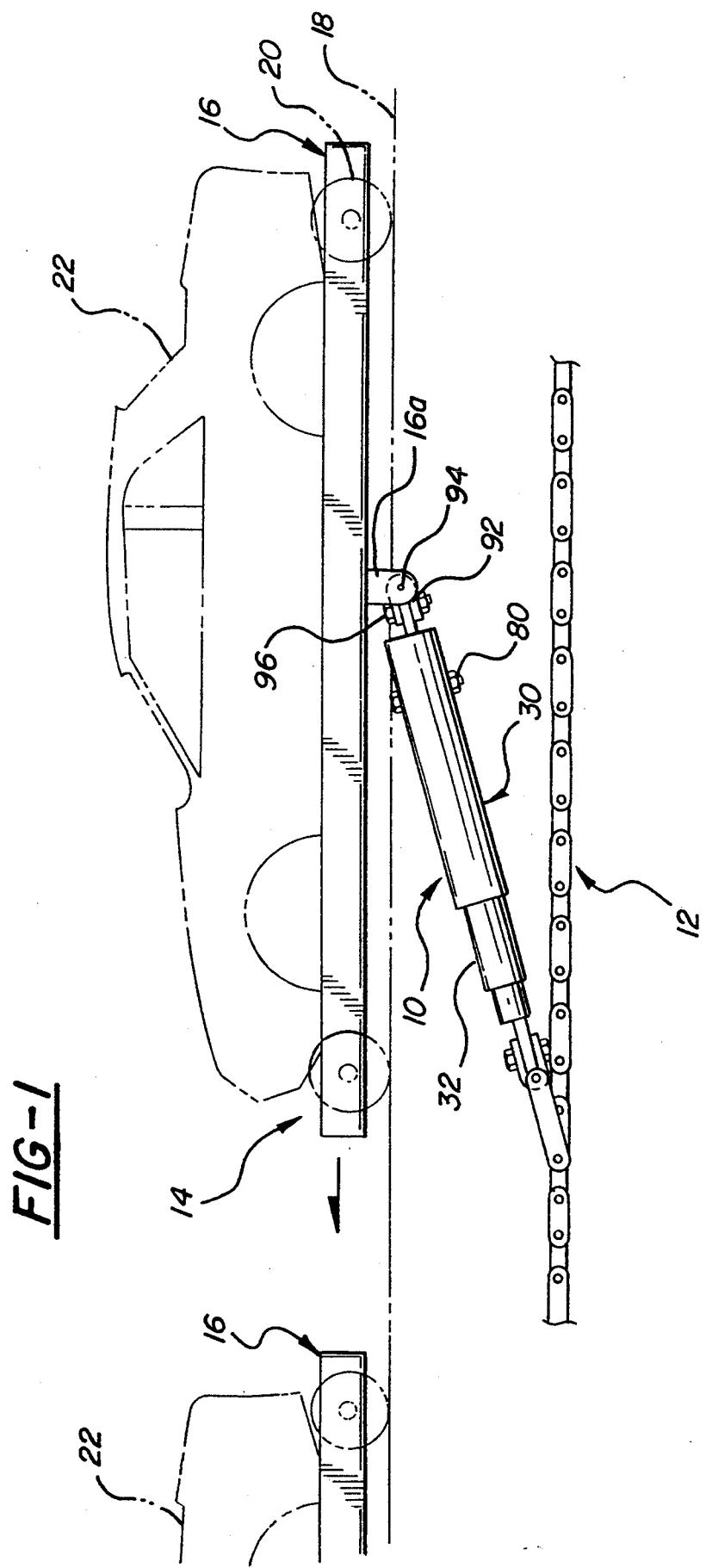
FIG. 1 is a fragmentary somewhat schematic view of a conveyor assembly system according to the invention.
Figure 2:
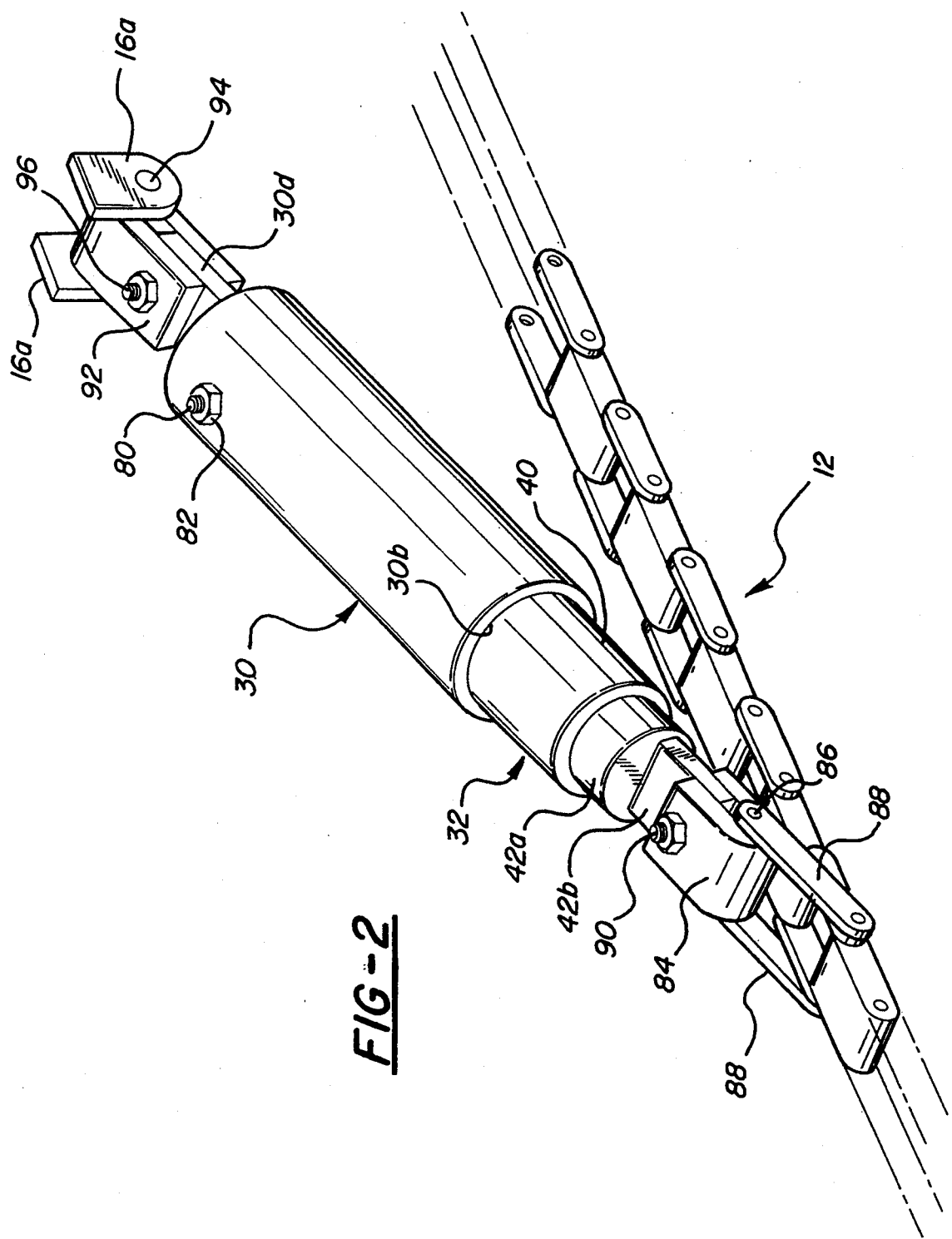
FIG. 2 is a fragmentary perspective view showing the snubber assembly of the invention attached to the driving conveyor assembly.
Figure 3:
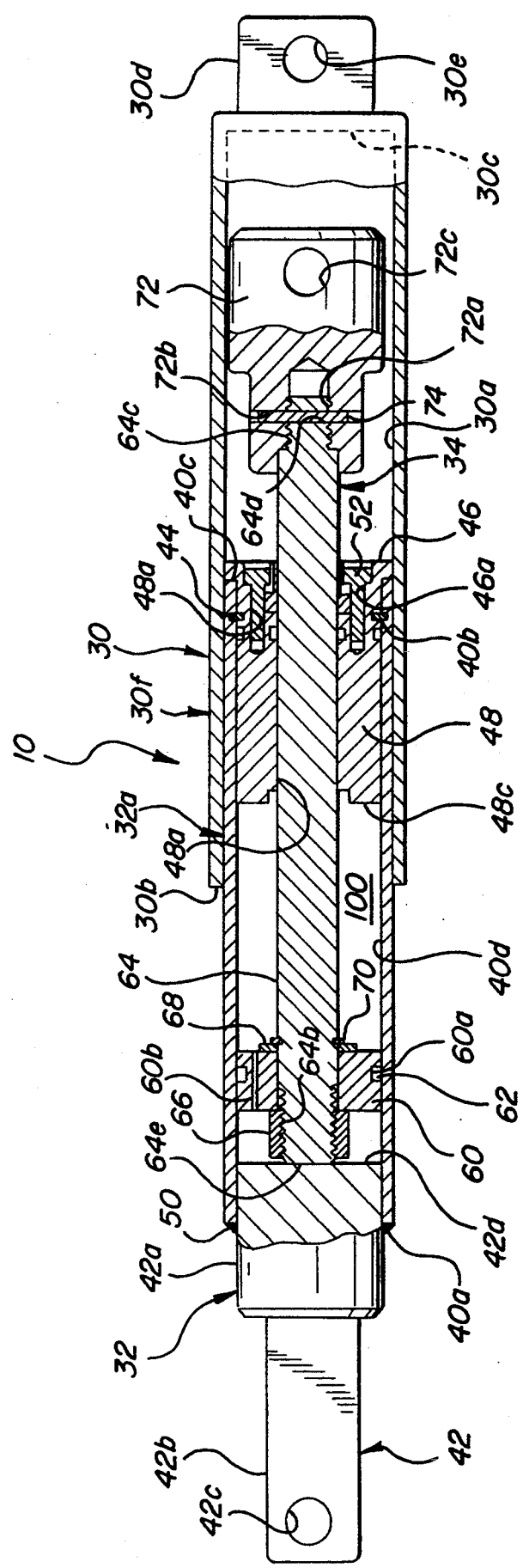
FIG. 3 is a cross sectional view of the invention snubber assembly.

The invention snubber assembly 10 is interposed between a driving conveyor assembly 12 and a driven conveyor assembly 14.

Driving conveyor assembly 12 may comprise, for example, a standard conveyor chain driven in known manner and driven conveyor assembly 14 may comprise a plurality of carriers 16, in the form of pallets, moving along a track 18 on wheels 20. Each pallet 16 is intended to receive a suitable load 22 such for example as an automobile body. It will be understood that driving conveyor assembly 12 and driven conveyor assembly 14 cooperate to move the loads 22 over a path defined by the track 18. Typically, the track 18 will move in a winding manner over a large work area as defined for example by a factory floor and typically a series of pallets, each carrying a load such as an automobile body, will be moved in train fashion along the track 18 with each pallet 16 connected to the driving conveyor assembly 12 by a snubber assembly 10.

Snubber assembly 10 is formed generally of metallic materials and includes a shield tube 30, a cylinder structure 32, and a piston assembly 34.

Shield tube 30 is of circular cross section and includes a bore 30a which is open at the inboard end 30b of the tube and is closed at the outboard end of the tube by an end wall 30c. A lug 30d is formed integral with end wall 30c and defines a pivot aperture 30e.

Cylinder structure 32 is of generally circular cross section and includes a tube 40, a clevis 42, a retaining ring 44, a retainer 46, and a sleeve bearing 48. Clevis 42 includes a cylindrical main body portion 42a positioned within the outboard end 40a of tube 40 and a lug portion 42b defining a pivot aperture 42c. Clevis 42 is fixedly positioned within tube 40 as by a weld 50.

Retaining ring 44 comprises a split ring received in an annular radially inwardly opening groove 40b proximate the inboard end 40c of tube 40; retainer 46 is positioned in the inboard end of tube 40 in abutting engagement with the inboard annular face of ring 44; sleeve bearing 48 is positioned within the bore 40d defined by tube 40 with its inboard end positioned against the outboard annular face of retaining ring 44; and retainer 46 and bearing 48 are held in clamped positions on opposite sides of retaining ring 44 by bolts 52 passing through circumferentially spaced apertures 46a in retainer 46 for threaded engagement with threaded bores 48a in the inboard face of bearing 48.

Piston assembly 34 includes a piston 60, a seal 62, a piston rod 64, a nut 66, a retaining ring 70, and a clevis 72.

Piston 60 is sized to fit slidably within cylinder bore 40d and includes an annular sealing groove 60a receiving annular seal 62. Retaining ring 70 is received in a annular groove in piston 64, washer 68 is positioned between retaining ring 70 and the inboard face of piston 60, and nut 66 coacts with the threaded outboard end portion 64b of the piston rod to clamp the piston 60 and the washer 68 between the nut and the retaining ring 70 and thereby fixedly position the piston on the piston rod.

Clevis 72 includes a threaded bore 72a coacting with a threaded portion 64c on the inboard end of the piston rod to threadably and fixedly secure the clevis to the outboard end of the piston rod with a lock pin 74 passing through aligned bores 72b and 64d in the clevis and piston rod respectively to further secure the clevis to the outboard end of the piston rod.

In the assembled relation of the snubber assembly 10 the inboard end portion 32a of the cylinder structure, as constituted by the inboard end portion of tube 40, is slidably and telescopically received in the inboard end portion 30f of the shield tube 30; piston 60 is slidably received in cylinder bore 40d; clevis 72 is fixedly secured in concentric relation within bore 30a by a bolt 80 passing through aligned apertures in tube 30 and through an aperture 72c in clevis 72 for threaded engagement by a lock nut 82; and piston rod 64 is positioned slidably within the central bore 48a defined by bearing 48.

The snubber assembly 10 is universally secured at its respective ends to conveyor assembly 12 and to conveyor assembly 14.

Specifically, the snubber assembly 10 is universally secured to conveyor assembly 12 by a U-shaped bracket 84 pivoting on a pin 86 carried on the free end of laterally spaced chain links or dogs 88 with a pivot pin 90 passing through apertures in bracket 84 and through aperture 42c in the lug portion 42b of the clevis 42.

Similarly, the snubber assembly 10 is universally secured to conveyor assembly 14 by a U-shaped bracket 92 pivotally mounted on a pin 94 carried by spaced lugs 16a extending downwardly from pallet 16 with a pin 96 passing through apertures in the bracket 92 and through aperture 32e in the lug 30d of tube 30.

It will be seen that the described universal connection of the snubber assembly at one end to the conveyor assembly 12 and at its other end to the conveyor assembly 14 allows the pallets 16 to digress both vertically and laterally with respect to the path of conveyor assembly 12 so that the conveyor assembly 12 need not precisely mimic the exact configuration of track 18. It will be seen that the snubber assembly 10 provides a tow bar to impart movement of the conveyor assembly 12 to conveyor assembly 14 so that the pallets 16 and the loads carried thereby are moved along the track 18 in response to movement of conveyor assembly 12. As the assembly operates to move the pallets 16 and the loads 22 along the track 18 it is periodically necessary to start and stop the assembly. The invention snubber assembly 10 operates to effectively minimize the shock loading imparted to the conveyor assembly 12 and the conveyor assembly 14 in response to such starting and stopping.

Specifically, snubber assembly 10 extends in response to starting of the conveyor assembly to cushion the shock loading and contracts in response to stopping of the conveyor assembly to cushion the shock loading. The snubber assembly may include hydraulic fluid or air in the pressure chamber 100 defined between the inboard face 42d of clevis main body portion 42a and the annular inboard face 48c of bearing 48. In either case, fluid moves from one side to the other of the piston 60, in response to extension or contraction of the snubber assembly, through one or more orifices 60b extending through the piston. In the case of hydraulic fluid in the chamber 100, and with a cylinder bore 40d of 2½ inches diameter, three orifices 60b may be provided in circumferentially spaced relation around the piston with each orifice having a diameter of approximately 0.125 inches. In the case of air in the chamber 100, and again assuming a cylinder bore diameter of 2½ inches, one orifice 60b may be provided having a diameter of 0.002 inches.

In normal operation, upon start-up of the assembly following a stoppage, the snubber assembly will initially extend in length with the tube 40 moving telescopically outwardly in bore 30a until the piston 60 moves into contact with annular bearing surface 48c whereupon a solid link is established between the conveyor assembly 12 and the conveyor assembly 14 so that further movement of the conveyor assembly 12 will be positively imparted to the conveyor assembly 14. As the snubber assembly extends in response to starting of the conveyor 12 following a stoppage, fluid moves through the orifice or orifices 60b from one side to the other of the piston to cushion the extending movement of the snubber assembly so that the ultimate engagement of the piston with bearing surface 48c is relatively gentle and imparts relatively little shock loading to the various components of the overall conveyor assembly.

Conversely, when the assembly is again stopped, the snubber assembly contracts initially with the tube 40 moving telescopically inwardly within bore 30a so as to move the piston toward the surface 42d defined by the inboard end of clevis 42. Depending upon the parameters of the system, and specifically the viscosity of the fluid vis-a-vis the diameter and length of the orifices 60b, the system may be designed so that the piston 60 moves to a point where the inboard end 64e of the piston rod contacts the clevis surface 42d or, alternatively, the system may be designed such that in a typical stopping situation the inboard end 64e of the piston rod stops at a distance short of the surface 42d. In either event, the contracting movement of the snubber assembly is cushioned by the passage of the fluid from one side to the other of the piston through the orifice or orifices 60b so that no significant shock loading is imparted to the overall conveyor system.

The invention snubber assembly will be seen to provide an effective means for cushioning the stopping and starting of the overall conveyor assembly to minimize shock loading on the assembly and further provide a snubber assembly requiring minimal servicing. Specifically, the prior art snubber assemblies of the this general type have suffered from problems associated with contaminants being deposited on the piston rod which ultimately interfere with the effective sliding movement of the piston rod within the bearing structure. In the invention structure, the sliding interface between the piston rod and the bearing structure is essentially free of contaminants since any contaminants deposited on the snubber assembly by a hostile environment through which the conveyor assembly is passing, such for example as a paint spray booth, will be deposited on the tube 40 rather than on the piston rod 34 and will not reach the critical interface between the piston rod 34 and the bearing 48. The invention structure also shields the piston rod from damage from falling objects or careless operators.

Whereas a preferred embodiment of the invention has been illustrated and described in detail it will be apparent that various changes may be made in the embodiment without departing from the scope or spirit of the invention. For example, although the invention has been illustrated and described with reference to a driving conveyor assembly positioned beneath the driven conveyor, the invention is equally applicable to a system in which the driving conveyor assembly is positioned over the driven conveyor assembly.

We claim:

1. A snubber assembly adapted to be interposed between a driving member and a driven member and including a cylinder structure defining a bore and adapted to be associated with one of the members, a piston mounted for reciprocal sliding movement in the cylinder bore, and a piston rod connected to the piston and adapted to be associated with the other member, characterized in that a shield bore is provided on the other member, the cylinder structure includes a hollow inboard end portion defining the cylinder bore and a solid outboard end portion closing the outboard end of the cylinder bore, the hollow inboard end portion of the cylinder structure is slidably received in the shield bore, the solid outboard end portion of the cylinder structure is positioned without the shield bore for engagement by the one member, the piston rod is positioned rigidly in the shield bore and extends into the cylinder bore for connection at its inboard end to the piston, the snubber assembly further includes a clevis fixedly positioned in the shield bore, and the outboard end of the piston rod is connected to the clevis.

2. A snubber assembly according to claim 1 wherein the shield bore is defined by a shield tube adapted to be attached to the other member and the clevis is fixedly positioned in the tube bore by a pin passing through the tube walls and the clevis.

3. A snubber assembly for interposition between a drive member and a driven member, said assembly including:
   a shield member adapted to be attached to one of said members and defining a shield bore;
   a cylinder structure including a hollow inboard end portion defining a cylinder bore and slidably received in the shield bore and a solid outboard end portion closing the outboard end of the cylinder bore and positioned without the shield bore for attachment to the other of said members;
   a piston slidably mounted in the cylinder bore;
   a piston rod; and
   a clevis secured to the outboard end of the piston rod and a pin fixedly secured in the shield bore and passing through the clevis to secure the outboard end of the piston fixedly in the shield bore with the inboard end of the piston rod extending into the cylinder bore for connection to the piston.

4. A snubber assembly according to claim 3 wherein the shield member comprises a shield tube for attachment to the driven member and the pin extends through the walls of the shield tube.

5. A conveyor assembly comprising:
   a track;
   a carrier mounted for movement along the track and adapted to support a load to be transported along the track;
   a conveyor assembly;
   a tube pivotably attached at its outboard end to the carrier and defining a tube bore opening at the inboard end of the tube;
   a cylinder structure including an outboard portion pivotably attached to the conveyor assembly and an inboard portion defining a cylinder bore and slidably received in the inboard end of the tube bore;
   a piston slidably mounted in the cylinder bore; and
   a piston rod fixedly positioned at its outboard end in the tube bore and extending into the cylinder bore for connection at its inboard end to the piston.

6. A conveyor assembly according to claim 5 wherein the assembly further includes a clevis secured to the outboard end of the piston rod and the piston rod is fixedly positioned in the tube bore by a pin passing through the clevis and through the walls of the tube.

7. A carriage assembly according to claim 5 wherein the cylinder structure further includes a bearing structure positioned in the cylinder bore proximate the inboard end of the cylinder structure and the piston rod passes slidably through the bearing structure.

* * * * *